United States Patent
Chou

(10) Patent No.: US 8,331,418 B2
(45) Date of Patent: Dec. 11, 2012

(54) COMMUNICATION DEVICE AND METHOD OF COMMUNICATION THAT PROVIDE A SILENT PERIOD FOR DETECTION AND AVOIDANCE

(75) Inventor: Chun-Ting Chou, Taipei (TW)

(73) Assignee: Koininklijke Philips Electronics, N.V., Eindhoven (NL)

(*) Notice: Subject to any disclaimer, the term of this patent is extended or adjusted under 35 U.S.C. 154(b) by 769 days.

(21) Appl. No.: 12/517,815

(22) PCT Filed: Dec. 11, 2007

(86) PCT No.: PCT/IB2007/055032
§ 371 (c)(1),
(2), (4) Date: Jun. 5, 2009

(87) PCT Pub. No.: WO2008/072188
PCT Pub. Date: Jun. 19, 2008

(65) Prior Publication Data
US 2011/0128993 A1    Jun. 2, 2011

Related U.S. Application Data

(60) Provisional application No. 60/869,619, filed on Dec. 12, 2006, provisional application No. 60/983,575, filed on Oct. 30, 2007.

(51) Int. Cl.
*H04B 1/00* (2006.01)

(52) U.S. Cl. ......... 375/135; 375/131
(58) Field of Classification Search ......... 375/131, 375/135, 130
See application file for complete search history.

(56) References Cited

U.S. PATENT DOCUMENTS

| | | | |
|---|---|---|---|
| 5,862,452 A * | 1/1999 | Cudak et al. | 725/81 |
| 6,473,410 B1 * | 10/2002 | Sakoda et al. | 370/330 |
| 2005/0276241 A1 * | 12/2005 | Kamerman et al. | 370/328 |
| 2006/0171445 A1 | 8/2006 | Batra | |

OTHER PUBLICATIONS

V.S. Somayazulu et al., "Detect and Avoid (DAA) Mechanisms for UWB Interference Mitigation", Ultra-Wideband, The 2006 IEEE 2006 International Conference on IEEE, PI, Sep. 2006, pp. 513-518, XP031007188.

* cited by examiner

*Primary Examiner* — David C. Payne
*Assistant Examiner* — Brian J Stevens
(74) *Attorney, Agent, or Firm* — Larry Liberchuk

(57) ABSTRACT

A system and method (600) of communication by a wireless device (200) operating according to a first communication protocol in at least a first set of frequency bands (320), provides a silent period for detecting the presence of a second wireless device operating according to a second communication protocol in a second set of frequency bands (310) that at least partially overlaps the first set of frequency bands (320).

20 Claims, 3 Drawing Sheets

COMMUNICATION DEVICE AND METHOD OF COMMUNICATION THAT PROVIDE A SILENT PERIOD FOR DETECTION AND AVOIDANCE

CROSS-REFERENCES TO RELATED APPLICATIONS

This patent application claims the priority benefit under 35 U.S.C. §119(e) of U.S. Provisional Patent Application 60/869,619, filed on 12 Dec. 2006, the entirety of which is hereby incorporated by reference as if fully set forth herein.

TECHNICAL FIELD

This invention pertains to the field of wireless communications, and more particularly to a wireless communication device and method of wireless communication in a communication network that provides a silent period for detecting the presence of other wireless communication devices operating in other wireless systems, to avoid interference with them.

BACKGROUND AND SUMMARY

As the demand for new wireless communication services and systems continues to expand, appropriate unused frequency spectrum for these new wireless systems becomes more difficult to identify. Meanwhile, in many situations it is the case that spectrum that has been previously allocated to existing services and systems actually is unused for extending periods of time in some geographical areas. Accordingly, it has become common to repurpose previously allocated frequency spectrum for new wireless communication services and systems.

However, in general when new wireless devices are permitted to operate in previously-allocated frequency bands, there is a requirement for these new wireless devices to protect the incumbent users of these frequency bands from interference. One example of this situation is presented by the development of wireless communication devices operating according to WiMedia ultrawideband (UWB) communication protocols.

In particular, detection and avoidance (DAA) is mandatory in Europe and Japan for UWB wireless devices operating in frequency spectrum from 3-4 GHz in order to satisfy regulatory requirements in those countries. The main purpose of DAA is to enable UWB devices to detect nearby incumbent devices operating in this frequency spectrum, and then adopt appropriate measures to protect the incumbent devices from potential interference caused by the UWB wireless devices and vice versa.

In particular, incumbent wireless devices that operate according to the emerging, worldwide WiMAX communication protocol may be affected by interference from UWB wireless devices. In a WiMAX network, a so-called WiMAX subscriber unit cannot transmit an "uplink" signal until it first receives a "downlink" signal from a WiMAX base station. If a WiMAX subscriber unit is located near one or more UWB wireless devices with heavy data traffic, and/or on the fringe of the coverage area of a WiMAX base station, then the WiMAX subscriber unit may not be able to receive the WiMAX base station's signal. In that case, the WiMAX subscriber unit cannot initiate an uplink transmission. Without an uplink transmission from the WiMAX subscriber unit, any nearby UWB wireless devices will not be able to detect the WiMax subscriber to avoid interfering with it. So this becomes a circular problem.

One solution to this problem is to insert silent periods in the transmissions of UWB wireless devices, so that any nearby WiMAX subscriber will at least have some opportunity during the silent periods to detect a downlink signal from a WiMAX base station and respond with an uplink signal to establish a link, which can then be detected by any nearby UWB wireless devices.

FIG. 1 illustrates silent periods in a UWB transmission. FIG. 1 illustrates how in each time period 100, $T_{TOTAL}$, all UWB devices must remain silent for a time interval 110, $T_{SILENT}$. Experiments have shown that to minimize the impact of UWB wireless devices on WiMAX subscriber units, and to insure that the WiMAX subscriber units will be able to "hear" a downlink signal from a WiMAX base station and then transmit an uplink signal which can be detected by nearby UWB wireless devices, $T_{SILENT}$ should be about 250~300 ms and $T_{TOTAL}$ should be about 900 ms.

Unfortunately, a silent period of 250~300 ms has a severe, negative, impact on the operation of UWB wireless devices. First, a UWB wireless device using the WiMedia communication protocol should not lose more than three consecutive beacons transmitted by a neighbor. Otherwise, according to the current WiMedia specification, the UWB device has to conclude that this neighbor has disappeared. Given that the time interval between two consecutive beacon transmissions from a UWB device is about 65 milliseconds, a silent period of 250~300 milliseconds, which is four times larger than 65 milliseconds between beacons, will break the normal operation of beacons. In addition, the data transmission also has to be suspended during the silent period, which can easily compromise quality of service (QoS) requirements for some UWB applications.

Accordingly, it would be desirable to provide a wireless communication device and method of wireless communication in a wireless communication system that provides a silent period for detecting the presence of other wireless communication devices operating in other wireless communication systems in the same frequency spectrum, to avoid interference with them. It would be particularly desirable to provide a UWB wireless device and corresponding method of operation that provides a silent period for detecting the presence of nearby WiMAX subscriber units operating in the same frequency spectrum, to avoid interference with them.

In one aspect of the invention, a method is provided for communication by a first wireless device operating according to a first communication protocol in at least a first set of frequency bands, wherein one or more of the frequency bands in the first set overlaps at least a portion of a second set of one or more frequency bands on which a second wireless device operates according to a second communication protocol. The method comprises: (1) dividing a time cycle into a plurality of subcycles, each subcycle having a period long enough for the second wireless device to receive a first signal according to the second communication protocol and to transmit a second signal according to the second communication protocol; (2) in each of the subcycles, selecting one of a plurality of logical channels available to the first wireless device, each logical channel employing a corresponding hopping sequence for frequency hopping among a subset of the frequency bands in the first set; (3) transmitting from the first wireless device a signal according to the first communication protocol in each of the subcycles, using the selected logical channel for that subcycle; and (4) repeating steps (1) to (3) over a plurality of time cycles. In each time cycle, each of the frequency bands of the first set which overlaps at least a portion of the second set of frequency bands is excluded in at least one of the hopping sequences employed by at least one of the logical channels selected in at least one of the subcycles.

In another aspect of the invention, a first wireless device is adapted to communicate according to a first communication protocol in at least a first set of frequency bands, wherein one or more of the frequency bands in the first set overlaps at least a portion of a second set of one or more frequency bands on which a second wireless device communicates according to a second communication protocol. The first wireless device comprises: a receiver; a transmitter; and at least one antenna operatively connected to the wireless receiver and wireless transmitter. The wireless device: (1) divides a time cycle into a plurality of subcycles, each subcycle having a period long enough for the second wireless device to receive a first signal according to the second communication protocol and to transmit a second signal according to the second communication protocol; (2) in each of the subcycles, selects one of a plurality of logical channels available to the first wireless device, each logical channel employing a corresponding hopping sequence for frequency hopping among a subset of the frequency bands in the first set; (3) transmits a signal according to the first communication protocol in each of the subcycles, using the selected logical channel for that subcycle; and (4) repeats steps (1) to (3) over a plurality of time cycles. In each time cycle, each of the frequency bands of the first set which overlaps at least a portion of the second set of frequency bands is excluded in at least one of the hopping sequences employed by at least one of the logical channels selected in at least one of the subcycles.

DETAILED DESCRIPTION

Figure 1:
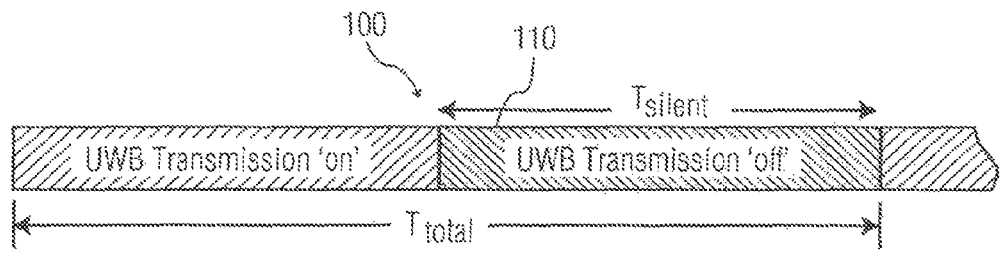
FIG. 1 illustrates silent periods in an ultra-wideband (UWB) transmission.
Figure 2:
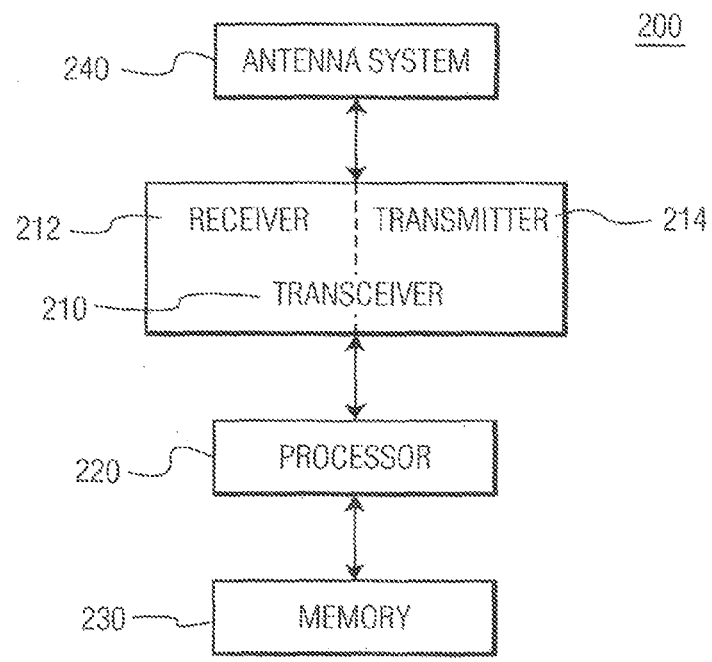
FIG. 2 is a functional block diagram of one embodiment of a wireless device.

FIG. 2 is a functional block diagram of a wireless device 100. As will be appreciated by those skilled in the art, one or more of the various "parts" shown in FIG. 2 may be physically implemented using a software-controlled microprocessor, hard-wired logic circuits, or a combination thereof. Also, while the parts are functionally segregated in FIG. 2 for explanation purposes, they may be combined variously in any physical implementation.

Wireless device 200 includes a transceiver 210, processor 220, memory 230, and an antenna system 240.

Transceiver 210 includes a receiver 212 and a transmitter 214 and provides functionality for wireless device 200 to communicate with other wireless devices in a wireless communication network according to the standard protocols of the wireless communication network. For example, in one embodiment wireless device 200 is a UWB wireless device adapted to operate using a communication protocol according to the WiMedia specifications.

Processor 220 is configured to execute one or more software algorithms in conjunction with memory 230 to provide the functionality of wireless device 200. Beneficially, processor 220 includes its own memory (e.g., nonvolatile memory) for storing executable software code that allows it to perform the various functions of wireless device 200. Alternatively, the executable code may be stored in designated memory locations within memory 230.

In FIG. 2, in one embodiment antenna system 240 may be a directional antenna system provides a capability for wireless device 200 to select from a plurality of antenna beams for communicating with other wireless devices in a plurality of directions. In one embodiment, directional antenna system 240 comprises a plurality of antennas each corresponding to one antenna beam. In another embodiment, directional antenna system 249 comprises a steerable antenna that can combine a plurality of different antenna elements to form a beam in a plurality of different directions.

In the discussion to follow, an exemplary embodiment is described for a method that provides a silent period for detecting the presence of a protected WiMAX communication device in the vicinity a UWB wireless device operating according to a WiMedia communication protocol. This concrete example is provided for illustration purposes and is not to be construed as limiting the scope of the teachings of this specification, or the claims to follow.

Figure 3:
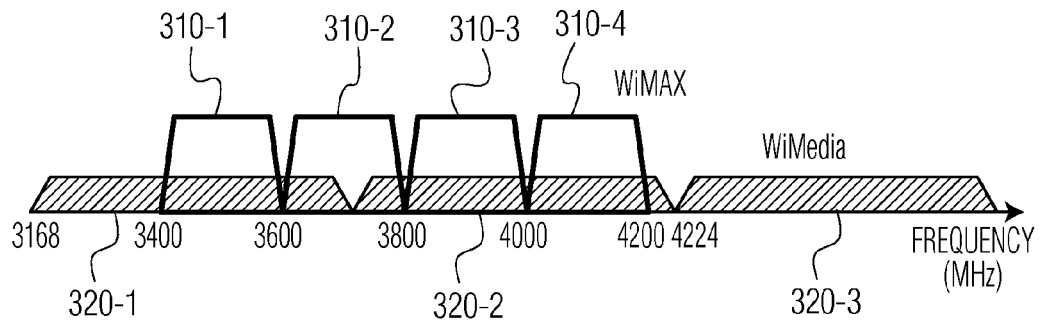
FIG. 3 illustrates the channelization of WiMAX and WiMedia UWB signals in the 3-4 GHz frequency spectrum.

FIG. 3 illustrates the channelization of WiMAX and WiMedia UWB signals in the 3-4 GHz frequency spectrum.

The current frequency spectrum allocation for WiMAX provides frequency bands 310 having a bandwidth of 200 MHz (i.e., Band "A" 310-1 from 3.4-3.6 GHz, and Band "B" 310-2 from 3.6-3.8 GHz). Furthermore, it is expected (and desirable) that eventual future bandwidth expansion might be provided in 200 MHz steps as well (Band "C" 310-3 from 3.8-4.0 GHz, Band "D" 310-4 from 4-4.2 GHz, etc.).

Meanwhile, UWB wireless devices employing the WiMedia communication protocol may operate in Band Group 1, which includes three 528-MHz frequency bands 320-1 through 320-3 (Band 1, Band 2, and Band 3) spanning 3.168 GHz to 4.752 GHz.

Also, a UWB wireless device communicating according to a WiMedia radio protocol operates on the basis of a superframe of 65,535 μsec, or about 65 milliseconds. During each superframe, the UWB wireless device transmits orthogonal frequency division multiplexed (OFDM) symbols each having a symbol period of about 312.5 nanoseconds.

In one embodiment, a UWB wireless device may frequency hop once every symbol period between the frequency bands Band 1, Band 2, and Band 3 according to a predefined hopping sequence. In that case, each predefined hopping sequence defines a logical channel of operation for the UWB wireless device. Table 1 below lists the available logical channels and their corresponding hopping sequences.

TABLE 1

| CHANNEL | BAND NUMBER | | | | | |
|---|---|---|---|---|---|---|
| 1 | 1 | 2 | 3 | 1 | 2 | 3 |
| 2 | 1 | 3 | 2 | 1 | 3 | 2 |
| 3 | 1 | 1 | 2 | 2 | 3 | 3 |
| 4 | 1 | 1 | 3 | 3 | 2 | 2 |
| 5 | 1 | 1 | 1 | 1 | 1 | 1 |
| 6 | 2 | 2 | 2 | 2 | 2 | 2 |
| 7 | 3 | 3 | 3 | 3 | 3 | 3 |
| 8 | 1 | 2 | 1 | 2 | 1 | 2 |

TABLE 1-continued

| CHANNEL | BAND NUMBER | | | | | |
|---|---|---|---|---|---|---|
| 9 | 1 | 3 | 1 | 3 | 1 | 3 |
| 10 | 2 | 3 | 2 | 3 | 2 | 3 |

As shown in Table 1, each of the logical channels employs a corresponding hopping sequence for frequency hopping among a subset of the frequency bands Band 1, Band 2 and Band 3 in Band Group 1.

From FIG. 3, it can be seen that if a UWB wireless device avoids transmitting on Band 1 for a long enough period of time (e.g., 250-300 milliseconds), then any nearby WiMax subscriber operating in Band A (3.4-3.6 GHz) will have sufficient time to "hear" a downlink signal from a WiMAX base station and then transmit an uplink signal which can be detected by nearby UWB devices. That is, if a UWB wireless device avoids transmitting on Band 1 for a long enough period of time (e.g., 250-300 milliseconds), then it can perform detection-and-avoidance (DAA) for any WiMax subscriber operating in Band A. Similarly, if a UWB wireless device avoids transmitting on Band 2 for a long enough period of time (e.g., 250-300 milliseconds), then DAA can be performed for any nearby WiMax subscriber operating in Bands B, C or D.

Toward this end, a dual-domain (e.g., time domain and frequency domain) silent period arrangement is provided as described below with respect to FIGS. 4-6.

Figure 4:
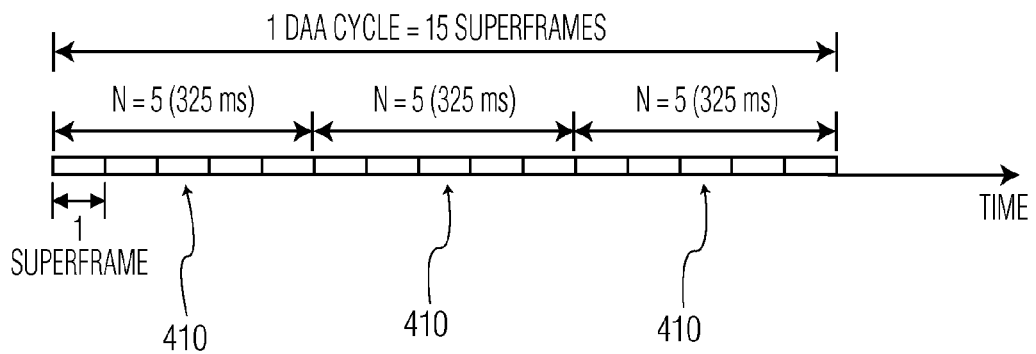
FIG. 4 illustrates one embodiment of a detect-and-avoid (DAA) time cycle for a wireless device operating according to a first communication protocol.

First, FIG. 4 illustrates one embodiment of a detect-and-avoid (DAA) time cycle 400 for a UWB device that operates according to a WiMedia communication protocol.

In FIG. 4 it is seen that each time cycle 400 is divided into a plurality of subcycles 410. Each subcycle 410 in turn comprises N superframes. Based on the requirement of providing a silent period of at least 250~300 milliseconds, and given a superframe period of about 65 milliseconds, in one exemplary embodiment N=5. However in other embodiments, N can be a different integer value. Furthermore, to provide a silent period for a WiMAX subscriber that repeats about every 900 milliseconds, each DAA time cycle comprises three (3) subcycles 410 of N=5 superframes each, such that the total period of each time cycle 410 is about 975 milliseconds. Of course, the period of time cycle 400, the period of subcycle 410, and the number of subcycles 410 in each time cycle 400 can be adjusted to provide unique benefits for any particular situation.

A UWB wireless device thus transmits over a series of repeating time cycles 400, each further comprising a plurality of subcycles.

Given the time cycle 400 of FIG. 4, and the logical channels of Table 1, a dual-domain silent period is provided as follows.

Figure 5:
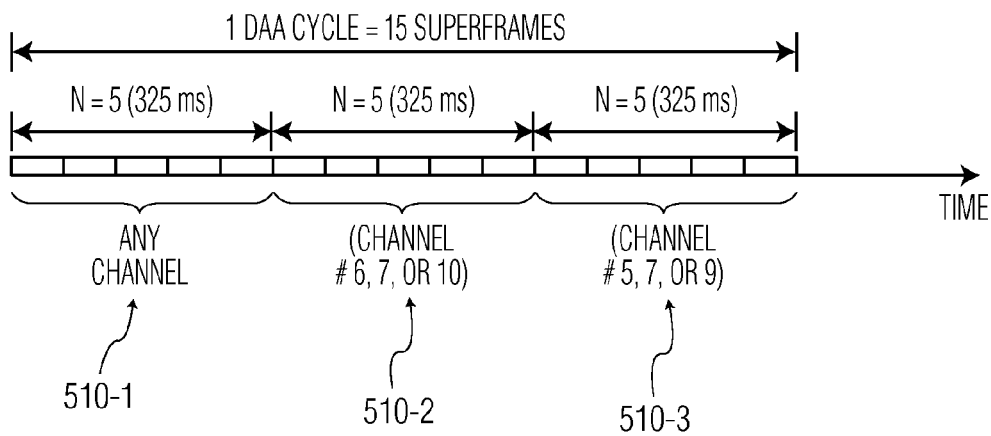
FIG. 5 illustrates an exemplary embodiment of a dual-domain silent period for a wireless device operating according to a first communication protocol.

FIG. 5 illustrates an exemplary embodiment of a dual-domain silent period 500 for a UWB wireless device. The dual-domain silent period 500 comprises an arrangement of time cycles, subcycles, and logical channels that insures that any WiMax subscriber operating in the vicinity of any UWB wireless devices, on any of the Frequency Bands A-D of FIG. 3, will have sufficient time to "hear" a downlink signal from a WiMAX base station and then transmit an uplink signal which can be detected by the nearby UWB devices.

In particular, dual-domain silent period 500 comprises: a first subcycle 510-1 wherein a UWB wireless device may transmit using any of the logical channels of Table 1; a second subcycle 510-2 wherein the UWB wireless device may only transmit using logical channels 6, 7 and 10 of Table 1; and a third subcycle 510-3 wherein the UWB wireless device may only transmit using logical channels 5, 7 and 9 of Table 1. According to this arrangement, no matter in which of the Frequency Bands A-D a particular WiMax subscriber operates, it will always experience a silent period of about 325 milliseconds each period of 970 milliseconds so it may "hear" a downlink signal from a WiMAX base station and then transmit an uplink signal which can be detected by nearby UWB devices. For example, any WiMax subscriber operating on frequencies from 3400-3696 MHz will experience a silent period during subcycle 510-2, during which time all WiMedia devices in its vicinity will be operating in logical channels that only include Frequency Band 2 and/or Frequency Band 3. Similarly, any WiMax subscriber operating on frequencies from 3696-4200 MHz will experience a silent period during subcycle 510-3, during which time all WiMedia devices in its vicinity will be operating in logical channels that only include Frequency Band 1 and/or Frequency Band 3.

Although in the example explained above, any of the logical channels 5, 7 and 9 could be using during subcycle 510-3, logical channel 9 may be preferred. For example, if the UWB wireless device transmits in only one frequency band and does not hop, as would be the case for logical channels 5 and 7, then the maximum permissible transmit power may have to be reduced substantially (e.g., by 50%) due to regulatory limitations. In one embodiment, the UWB wireless device selects for each subcycle the logical channel among those available that employs the hopping sequence that hops among the greatest number of frequency bands.

It should be understood that the order of the arrangement of three subcycles 510-1 through 510-3 and their corresponding logical channels may be switched in any order (e.g., subcycle 510-2 may correspond to logical channels 5, 7 and 9, and subcycle 510-3 may correspond to logical channels 6, 7 and 10).

In the example described above, it is seen that only Frequency Bands 1 and 2 for the UWB wireless device overlap the Frequency Bands A-D on which the WiMax subscribers may operate, and that Frequency Band 3 does not overlap any of the Frequency Bands A-D on which the WiMax subscribers may operate. Thus it is only required in this example that the dual-domain silent period 500 provide the 250-300 milliseconds of quiet time in Frequency Bands 1 and 2. Accordingly, any of the available logical channels of Table 1 can be used in the first subcycle 510-1, and the quiet time for Frequency Bands 1 and 2 can be provided in subcycles 510-2 and 510-3.

However, if Frequency Band 3 did overlap any frequency bands on which a WiMax subscriber may operate, then dual-domain silent period 500 could be modified such that in the first subcycle 510-1, the UWB wireless device could only transmit using logical channels 5, 6 and 8, thereby providing a quiet period for Frequency Band 3.

The method described above guarantees that WiMAX subscriber units operating in 3400~4200 MHz frequency spectrum will be provided with a silent period of 325 ms every 975 ms. Therefore, WiMAX subscriber units can establish uplink data transmission with a WiMAX base station with a negligible "entry" delay. Also, beneficially, such a long silent period does not affect the UWB devices' beacon or data transmissions, as the UWB devices are silent only at certain frequencies at any given time.

The example described above can be extrapolated for different devices operating with different communication protocols on different numbers of frequency bands, with different quiet period requirements, etc.

In general, the dual-domain silent period can be applied as follows. Consider a first wireless device operating according to a first communication protocol in at least a first set of frequency bands, and a second wireless device that operates according to a second communication protocol in at least a second set of frequency bands, wherein one or more of the frequency bands in the first set overlaps at least a portion of the second set of frequency bands. In that case, the dual-domain silent period should be arranged such that, in each time cycle, each of the frequency bands of the first set which overlaps at least a portion of the second set of frequency bands is excluded in at least one of the hopping sequences employed by at least one of the logical channels selected in at least one of the subcycles. This can be achieved in a variety of ways. In one embodiment, in each subcycle the selected logical channel employs a hopping sequence that excludes at least one of the frequency bands of the first set. In another embodiment, in each subcycle the selected logical channel employs a hopping sequence that excludes a corresponding one of the frequency bands of the first set. In yet another embodiment, over each time cycle, each of the frequency bands of the first set is excluded in at least one of the hopping sequences employed by at least one of the logical channels selected in at least one of the subcycles. Other arrangements are possible depending on the nature of the overlap between the frequency bands in the first set and frequency bands in the second set.

Figure 6:
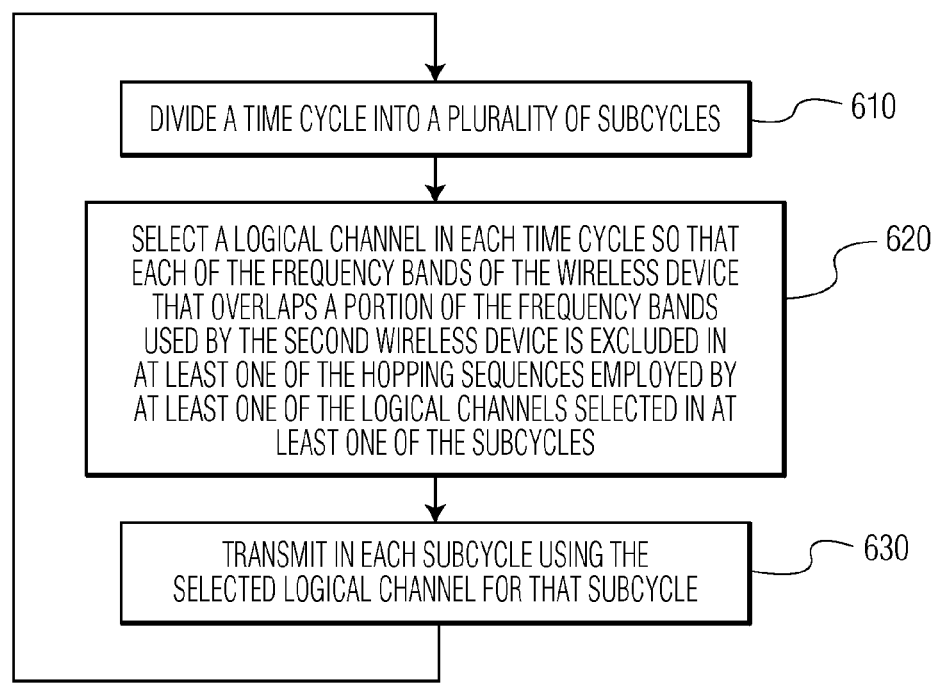
FIG. 6 is a flowchart illustrating a method of communication that provides a silent period for detecting the presence of a protected communication device in the vicinity.

FIG. 6 is a flowchart illustrating a method 600 of communication for a first wireless device operating according to a first communication protocol in at least a first set of frequency bands, where a second (protected or incumbent) wireless device operates according to a second communication protocol in at least a second set of frequency bands, and wherein one or more of the frequency bands in the first set overlaps at least a portion of the second set of frequency bands. The method provides a silent period for the first wireless device to detect the presence of a second wireless device in the vicinity.

In a first step 610, a time cycle is divided into a plurality of subcycles. Each subcycle has a period long enough for the second wireless device to receive a first signal according to the second communication protocol and to transmit a second signal according to the second communication protocol. The first wireless device may detect the second signal and thereby detect the presence of the second wireless device.

In a step 620, in each of the subcycles the first wireless device selects one of a plurality of logical channels available to the first wireless device. Each logical channel employs a corresponding hopping sequence for frequency hopping among a subset of the frequency bands in the first set. In each time cycle, each of the frequency bands of the first set which overlaps at least a portion of the second set of frequency bands is excluded in at least one of the hopping sequences employed by at least one of the logical channels selected in at least one of the subcycles. This provides a dual-domain silent period for detection of any of the second devices in the vicinity of the first device In a step 630, the first wireless device transmits a signal according to the first communication protocol in each of the subcycles, using the selected logical channel for that subcycle.

Steps 610 through 630 are repeated over a plurality of time cycles for as long as the first wireless device desires to transmit data.

While preferred embodiments are disclosed herein, many variations are possible which remain within the concept and scope of the invention. Such variations would become clear to one of ordinary skill in the art after inspection of the specification, drawings and claims herein. The invention therefore is not to be restricted except within the spirit and scope of the appended claims.

What is claimed is:

1. A method of communication by a first wireless device operating according to a first communication protocol in at least a first set of frequency bands, wherein one or more of the frequency bands in the first set overlaps at least a portion of a second set of one or more frequency bands on which a second wireless device operates according to a second communication protocol, the method comprising:
   (1) dividing a time cycle into a plurality of subcycles, each subcyle having a period long enough for the second wireless device to receive a first signal according to the second communication protocol and to transmit a second signal according to the second communication protocol;
   (2) in each of the subcycles, selecting one of a plurality of logical channels available to the first wireless device, each logical channel employing a corresponding hopping sequence for frequency hopping among a subset of the frequency bands in the first set;
   (3) transmitting from the first wireless device a signal according to the first communication protocol in each of the subcycles, using the selected logical channel for that subcycle; and
   (4) repeating steps (1) to (3) over a plurality of time cycles;
   wherein in each time cycle, each frequency band of the first set that overlaps at least a portion of the second set of frequency bands is excluded in at least one of the hopping sequences employed by at least one of the logical channels selected in at least one of the subcycles.

2. The method of claim 1, wherein in each subcycle the selected logical channel employs a hopping sequence that excludes at least one of the frequency bands of the first set.

3. The method of claim 1, wherein in each subcycle the selected logical channel employs a hopping sequence that excludes a corresponding one of the frequency bands of the first set.

4. The method of claim 1, wherein over each time cycle, each of the frequency bands of the first set is excluded in at least one of the hopping sequences employed by at least one of the logical channels selected in at least one of the subcycles.

5. The method of claim 1, wherein selecting one of a plurality of logical channels available to the first wireless device in each subcycle comprises selecting a one of the available logical channels that employs a hopping sequence that hops among a subset that includes a greatest number of frequency bands in the first set.

6. The method of claim 1, wherein the first set of frequency bands comprises three frequency bands, wherein the time cycle is divided into a plurality of subcycles each having a length of at least 200 milliseconds, wherein each time cycle has a length from 0.9 seconds to 1.0 seconds.

7. The method of claim 6, wherein a number of available logical channels is ten.

8. The method of claim 7, wherein the available logical channels and their corresponding hopping sequences are according to the following table:

| CHANNEL | BAND NUMBER | | | | | |
| --- | --- | --- | --- | --- | --- | --- |
| 1 | 1 | 2 | 3 | 1 | 2 | 3 |
| 2 | 1 | 3 | 2 | 1 | 3 | 2 |
| 3 | 1 | 1 | 2 | 2 | 3 | 3 |
| 4 | 1 | 1 | 3 | 3 | 2 | 2 |
| 5 | 1 | 1 | 1 | 1 | 1 | 1 |

-continued

| CHANNEL | BAND NUMBER | | | | | |
|---|---|---|---|---|---|---|
| 6 | 2 | 2 | 2 | 2 | 2 | 2 |
| 7 | 3 | 3 | 3 | 3 | 3 | 3 |
| 8 | 1 | 2 | 1 | 2 | 1 | 2 |
| 9 | 1 | 3 | 1 | 3 | 1 | 3 |
| 10 | 2 | 3 | 2 | 3 | 2 | 3. |

9. The method of claim 6, wherein each subcycle comprises five superframes according to the first communication protocol.

10. The method of claim 1, further comprising the first wireless device transmitting one orthogonal frequency division multiplexed (OFDM) symbol during each frequency hop.

11. A first wireless device adapted to communicate according to a first communication protocol in at least a first set of frequency bands, wherein one or more of the frequency bands in the first set overlaps at least a portion of a second set of one or more frequency bands on which a second wireless device communicates according to a second communication protocol, the first wireless device comprising:
 a receiver;
 a transmitter; and
 at least one antenna operatively connected to the receiver and transmitter,
 wherein the wireless device:
  (1) divides a time cycle into a plurality of subcycles, each subcyle having a period long enough for the second wireless device to receive a first signal according to the second communication protocol and to transmit a second signal according to the second communication protocol;
  (2) in each of the subcycles, selects one of a plurality of logical channels available to the first wireless device, each logical channel employing a corresponding hopping sequence for frequency hopping among a subset of the frequency bands in the first set;
  (3) transmits a signal according to the first communication protocol in each of the subcycles, using the selected logical channel for that subcycle; and
  (4) repeats steps (1) to (3) over a plurality of time cycles;
 wherein in each time cycle, each frequency band of the first set that overlaps at least a portion of the second set of frequency bands is excluded in at least one of the hopping sequences employed by at least one of the logical channels selected in at least one of the subcycles.

12. The device of claim 11, wherein in each subcycle the selected logical channel employs a hopping sequence that excludes at least one of the frequency bands of the first set.

13. The device of claim 11, wherein in each subcycle the selected logical channel employs a hopping sequence that excludes a corresponding one of the frequency bands of the first set.

14. The device of claim 11, wherein over each time cycle, each of the frequency bands of the first set is excluded in at least one of the hopping sequences employed by at least one of the logical channels selected in at least one of the subcycles.

15. The device of claim 11, wherein selecting one of a plurality of logical channels available to the first wireless device in each subcycle comprises selecting a one of the available logical channels that employs a hopping sequence that hops among a subset that includes a greatest number of frequency bands in the first set.

16. The device of claim 11, wherein the first set of frequency bands comprises three frequency bands, wherein the time cycle is divided into a plurality of subcycles each having a length of at least 200 milliseconds, wherein each time cycle has a length from 0.9 seconds to 1.0 seconds.

17. The device of claim 16, wherein a number of available logical channels is ten.

18. The device of claim 17, wherein the available logical channels and their corresponding hopping sequences are according to the following table:

| CHANNEL | BAND NUMBER | | | | | |
|---|---|---|---|---|---|---|
| 1 | 1 | 2 | 3 | 1 | 2 | 3 |
| 2 | 1 | 3 | 2 | 1 | 3 | 2 |
| 3 | 1 | 1 | 2 | 2 | 3 | 3 |
| 4 | 1 | 1 | 3 | 3 | 2 | 2 |
| 5 | 1 | 1 | 1 | 1 | 1 | 1 |
| 6 | 2 | 2 | 2 | 2 | 2 | 2 |
| 7 | 3 | 3 | 3 | 3 | 3 | 3 |
| 8 | 1 | 2 | 1 | 2 | 1 | 2 |
| 9 | 1 | 3 | 1 | 3 | 1 | 3 |
| 10 | 2 | 3 | 2 | 3 | 2 | 3. |

19. The device of claim 16, wherein each subcycle comprises five superframes according to the first communication protocol.

20. The device of claim 11, further comprising the first wireless device transmitting one orthogonal frequency division multiplexed (OFDM) symbol during each frequency hop.

* * * * *